July 25, 1967     G. T. GILMORE     3,332,459
INSULATION FORMING DEVICE
Filed May 13, 1965     2 Sheets-Sheet 1
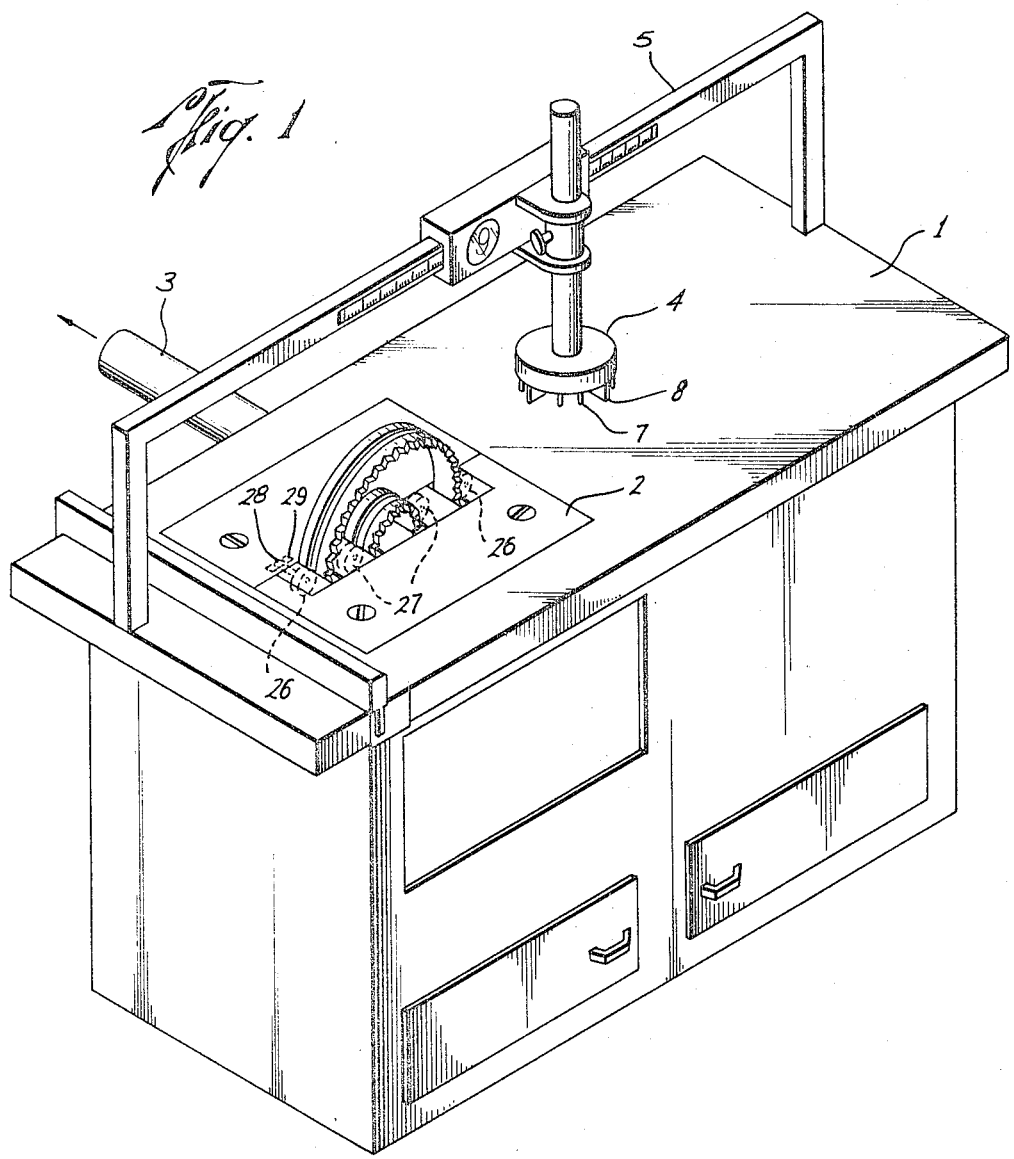
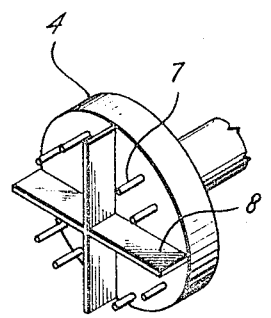
Guy T. Gilmore
INVENTOR.
BY Ranseler O. Wyatt
ATTORNEY July 25, 1967   G. T. GILMORE   3,332,459
INSULATION FORMING DEVICE
Filed May 13, 1965   2 Sheets-Sheet 2
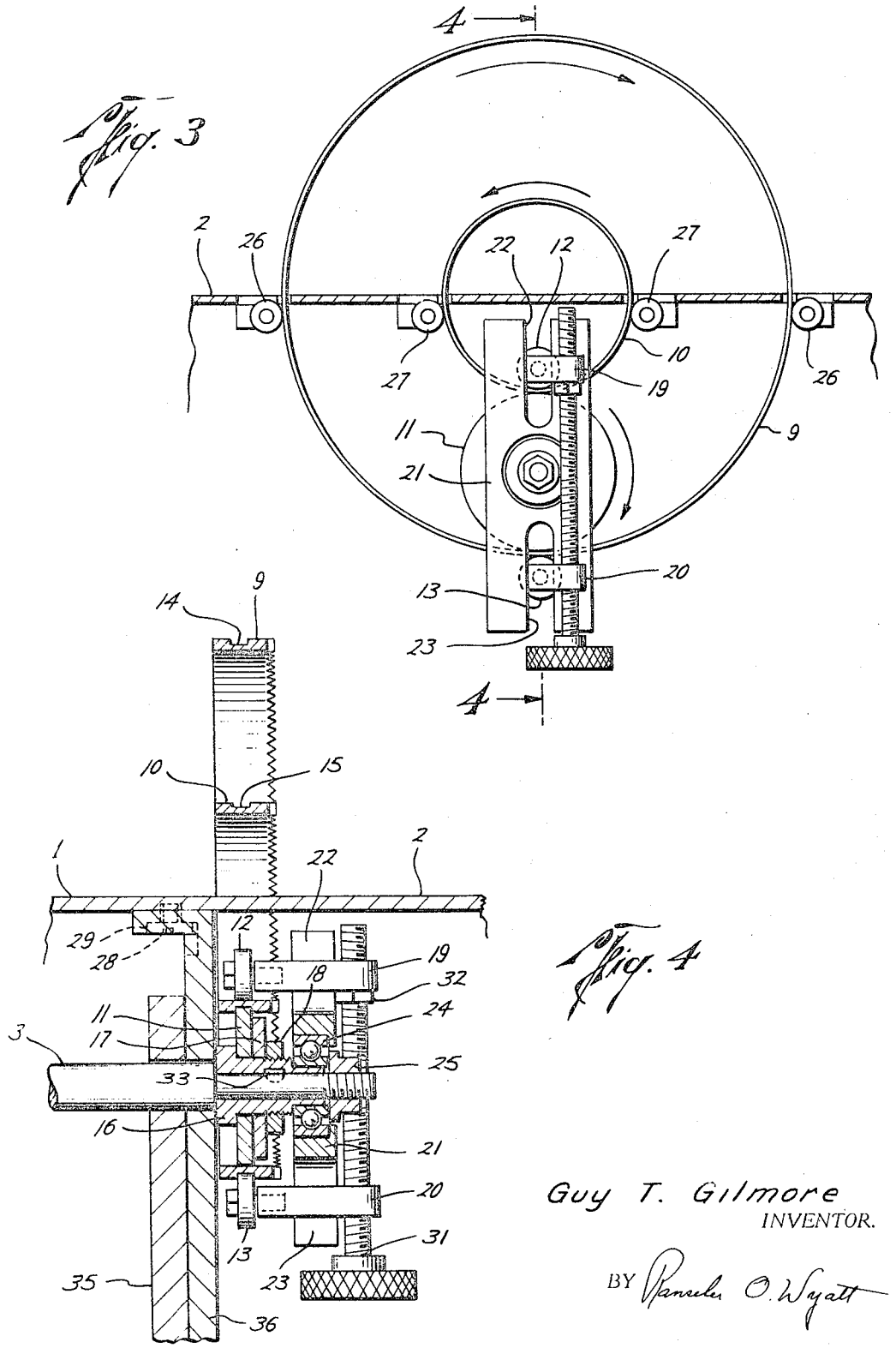
Guy T. Gilmore
INVENTOR.
BY Pamela O. Wyatt
ATTORNEY

3,332,459
INSULATION FORMING DEVICE
Guy T. Gilmore, Agua Dulce, Tex.
(6603 Winfree, Houston, Tex. 77017)
Filed May 13, 1965, Ser. No. 455,560
6 Claims. (Cl. 143—85)

This invention relates to new and useful improvements in an insulation forming device.

It is an object of this invention to provide a device for forming insulation for conduits from suitable insulating material such as a block of calcium silicate, foamglass, polyurethane or the like, the completed article being one of a pair to be joined to form a cover for conduit elbows, turns and the like.

It is another object of this invention to provide an insulator forming device for conduits, having novel means for forming the insulator in a single operation and having novel means for quickly and readily changing the size of the cutting blades to vary the size of insulators so formed.

It is another object of the invention to provide novel means for adjusting the tension rollers of the blade holding device.

This is a supplemental application to the application previously filed by me on Apr. 26, 1965, Ser. No. 450,611 for an Insulating Forming Apparatus and the Method of Forming an Article of Manufacture, now pending before the Patent Office.

With the above and other objects in view, the invention has relation to certain novel features of operation, construction, and arrangement of parts more particularly defined in the following specifications and illustrated in the accompanying drawings, wherein:

FIGURE 1 is an elevational perspective view of the device.

FIGURE 2 is an enlarged view of the block guide employed.

FIGURE 3 is an enlarged view of the cutter blade assembly mounted in a bench, and FIGURE 4 is a cross sectional elevational view of the cutter blade assembly taken on the line 4—4 of FIGURE 3.

Referring now more particularly to the drawings, the numeral 1 designates the bench or table in which the device is mounted having a recessed area in which the cutter assembly is mounted, covered by the plate 2 and into which a suitable drive shaft 3 extends through suitable backing plates 35, 36, to impart rotation to the assembly.

Mounted on the bench and extending longitudinally thereof and elevated from the bench working surface is the block holder 4, horizontally adjustable on the frame 5. The holder 4 has the rotating disc 6 with downwardly extending teeth 7 and the guide members 8.

The cutting blade assembly consists of the annular outer cutting blade 9 and the inner cutting blade 10 mounted in the assembly by means of the main drive roller 11 and the tension rollers 12, 13. Annular peripheral grooves 14, 15 are formed in the blades 9 and 10, respectively, which act as tracks for maintaining the blades in position as they rotate. The main drive roller 11 is mounted on a suitable roller bushing 16 which is mounted on the drive shaft 3. The bushing 16 has an annular shoulder 34 against which the drive roller 11 abuts, and a washer 17 and nut 18 maintain the main drive roller 11 on the bushing 16, the extended end of the bushing 16 being externally threaded to receive said nut 18. The tension rollers 12, 13 are mounted on roller mounts 19, 20 which extend through the adjusting plate 21, which has the vertically elongated grooves 22, 23 to permit vertical adjustment of the roller mounts 19, 20. The adjustment plate 21 is mounted on the drive shaft 3 by means of the bearing 24, mounted on a reduced section of the drive shaft, and a lock nut 25, mounted on the extended and circumferentially reduced and externally threaded end of the drive shaft bears against the bearing 24 to maintain the assembly in position.

Horizontally adjustable blade guides 26, 26 and 27, 27 are mounted in the cover plate 2 to provide additional guides to the cutting blades, said guides having rollers which ride in the tracks 14, 15 of the cutting blades. Screws as 28 permit the release of the guides 26, 27 so that the guides may be moved horizontally in the slots 29 to provide the desired adjustment.

The blades 9, 10 are mounted in the assembly prior to mounting of the assembly in the bench 1, and the adjusting screw 31, which extends through the roller mounts 19, 20, the extended ends of said roller mounts being provided with internally threaded passageways for this purpose, provides means for adjusting the tension rollers and maintaining the cutting blades 9 and 10 in friction contact with the main drive roller 11. A lock nut 32 provides means for maintaining the tension roller mounts in the set position. The assembly is then placed in position on the drive shaft and maintained there by applying the nut 25 to the extended and threaded end of the drive shaft and the bushing 16 maintained in rotating position on the drive shaft by means of a suitable key as 33. The tension rollers 26, 27 are then adjusted to bear against the outer surface of the respective blades 9, 10. A block of insulating material is placed on the bench 1 and one corner of the block positioned in the angle formed by two of the guides 8 and the holder 1 then lowered, with the teeth 7 penetrating the insulating material. The drive shaft is then activated and the block pushed into the rotating cutting blades and the block of material will pivot with the rotation of the holder 1 and the insulating article thus formed, the outer cutting blade 9 rotating in one direction, will form the outer surface of the insulating article and the inner blade 10, rotating in the opposite direction, will form the inner wall of the insulating article. When a different size of insulating article is desired, the entire assembly is removed by removing the cover plate 3, then the nut 25 and withdrawing the assembly from the shaft 3. To change the blade in the assembly, the locking nut 32 is released and the screw 31 rotated to release the tension roller mounts. The blades 9, 10 removed and another set substituted for them, with the roller 13 fitted in the track 14 of the outer blade and the main drive roller fitted in the track 15 of the inner blade 10. The screw 31 is then rotated to bring the tension rollers 12, 13 into position, the roller mounts moved vertically in the slots 22, 23 of the plate 21, and the lock nut 32 tightened to maintain the parts in position.

While the foregoing is considered a preferred form of the invention, it is by way of illustration only, the broad principle of the invention being defined by the appended claims.

What I claim is:

1. In an insulating article forming device, a bench, a cutting assembly rotatably mounted in said bench, said cutting assembly having an outer and inner cutting blade concentrically mounted, each of said blades having a groove formed in the outer surface thereof, a main drive roller seated in one of said grooves and being in friction contact with each blade and tension rollers bearing against the one side or each blade, maintaining said blades against the main drive roller.

2. In an insulating article forming device, a bench, a cutting assembly mounted in said bench, said cutting assembly having an outer and inner rotating cutting blade concentrically mounted, each of said blades having a groove formed in the outer surface thereof, a main drive roller in friction contact with each blade in said inner blade and seated in said groove and tension rollers bearings against one side of each blade maintaining said blades against the main drive roller, means for adjustably mounting said tension rollers in said assembly and manually adjusting said tension rollers.

3. The device as described in claim 2 having tension rollers adjustably mounted in the surface of said bench and bearing against said blades at said bench surface.

4. In an insulation forming device, a bench having a working surface and a drive shaft extending into said bench, a cutting assembly recess formed in said bench, a cutting assembly mountable in said recess comprising a pair of annular cutting blades, a roller bushing mountable on said drive shaft, a main drive roller mounted on said bushing, a tension roller plate mounted on said drive shaft, a pair of vertically adjustable tension rollers mounted on said plate, said tension rollers movable into position against said blades to maintain said blades in friction contact with said main drive roller.

5. In an insulation forming device, a bench having a working surface and a drive shaft extending into said bench, a cutting assembly recess formed in said bench, a cutting assembly mounted in said recess, said cutting assembly comprising a pair of annular cutting blades, a roller bushing mountable on said drive shaft, a main drive roller mounted on said bushing, a tension roller plate mounted on said drive shaft, a pair of vertically adjustable tension rollers mounted on said plate, said tension rollers being movable into position against said plates to maintain said plates in friction contact with said main drive roller and guide rollers adjustably mounted at the working surface of said bench.

6. In an insulation forming device, a bench having a framework extending longitudinally over the working surface, a rotatable insulation block guide mounted on said framework and adjustable horizontally and vertically thereon, said guide having downwardly extending teeth and guide plates, said guide plates extending below said teeth and first receiving the corner of a block of insulating material and aligning same and said teeth penetrating said material after the block has been aligned by said plates, a cutting blade assembly mounted in said bench having means for forming the upper and lower surfaces of an insulating article as a block of material is pivoted on said block guide.

References Cited
UNITED STATES PATENTS

| | | | |
|---|---|---|---|
| 2,696,230 | 12/1954 | Libby | 143—171 |
| 2,751,941 | 6/1956 | Smith | 143—85 |
| 2,753,899 | 7/1956 | Murfin | 143—171 |
| 2,780,896 | 2/1957 | Jaye | 143—85 |
| 2,809,680 | 10/1957 | Nethery et al. | 143—85 |
| 2,841,193 | 7/1958 | Petrofsky | 143—171 |
| 2,898,955 | 8/1959 | Schwartz | 143—171 |
| 2,983,175 | 5/1961 | Harris | 83—635 |
| 3,060,779 | 10/1962 | Taft | 83—582 |
| 3,203,456 | 8/1965 | Witschnig | 143—85 |

WILLIAM W. DYER, JR., *Primary Examiner.*

L. B. TAYLOR, J. M. MEISTER, *Assistant Examiners.*